May 6, 1952     E. MULLEN ET AL     2,595,533
LOADING EQUIPMENT FOR VEHICLE CARRYING TRAILERS
Filed May 10, 1946     3 Sheets—Sheet 1
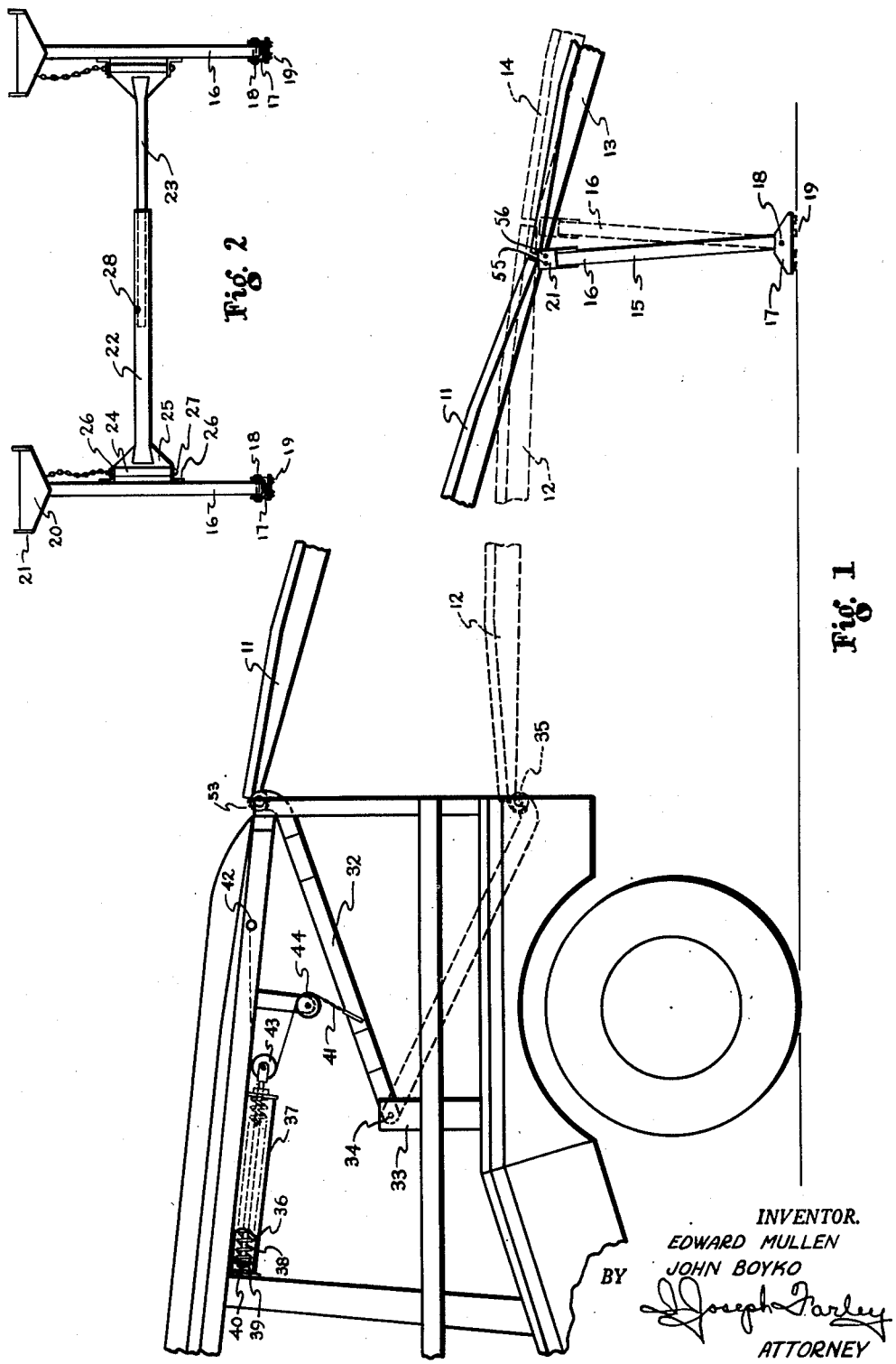
INVENTOR.
EDWARD MULLEN
JOHN BOYKO
BY
ATTORNEY

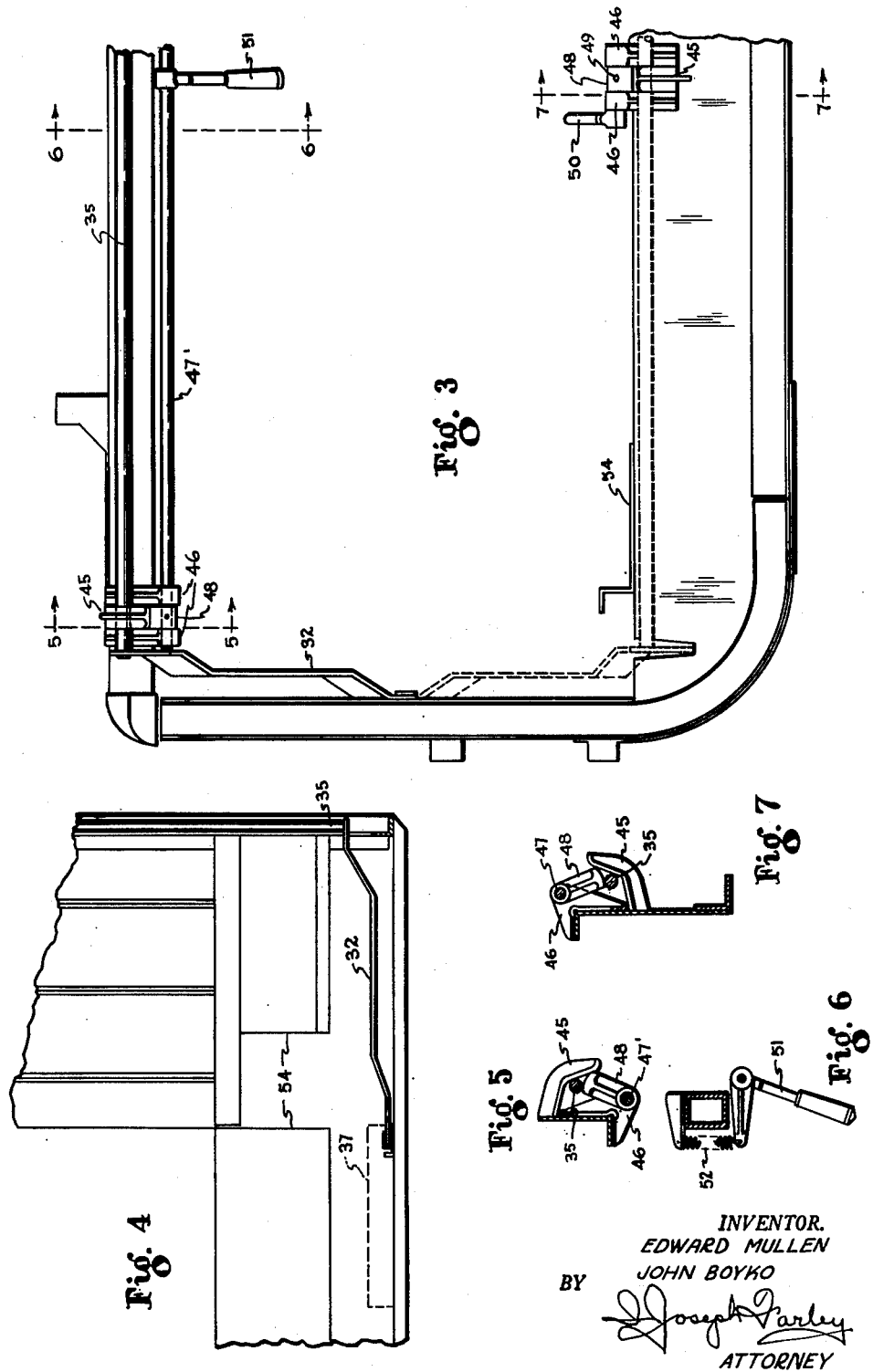

May 6, 1952      E. MULLEN ET AL      2,595,533
LOADING EQUIPMENT FOR VEHICLE CARRYING TRAILERS
Filed May 10, 1946      3 Sheets-Sheet 3
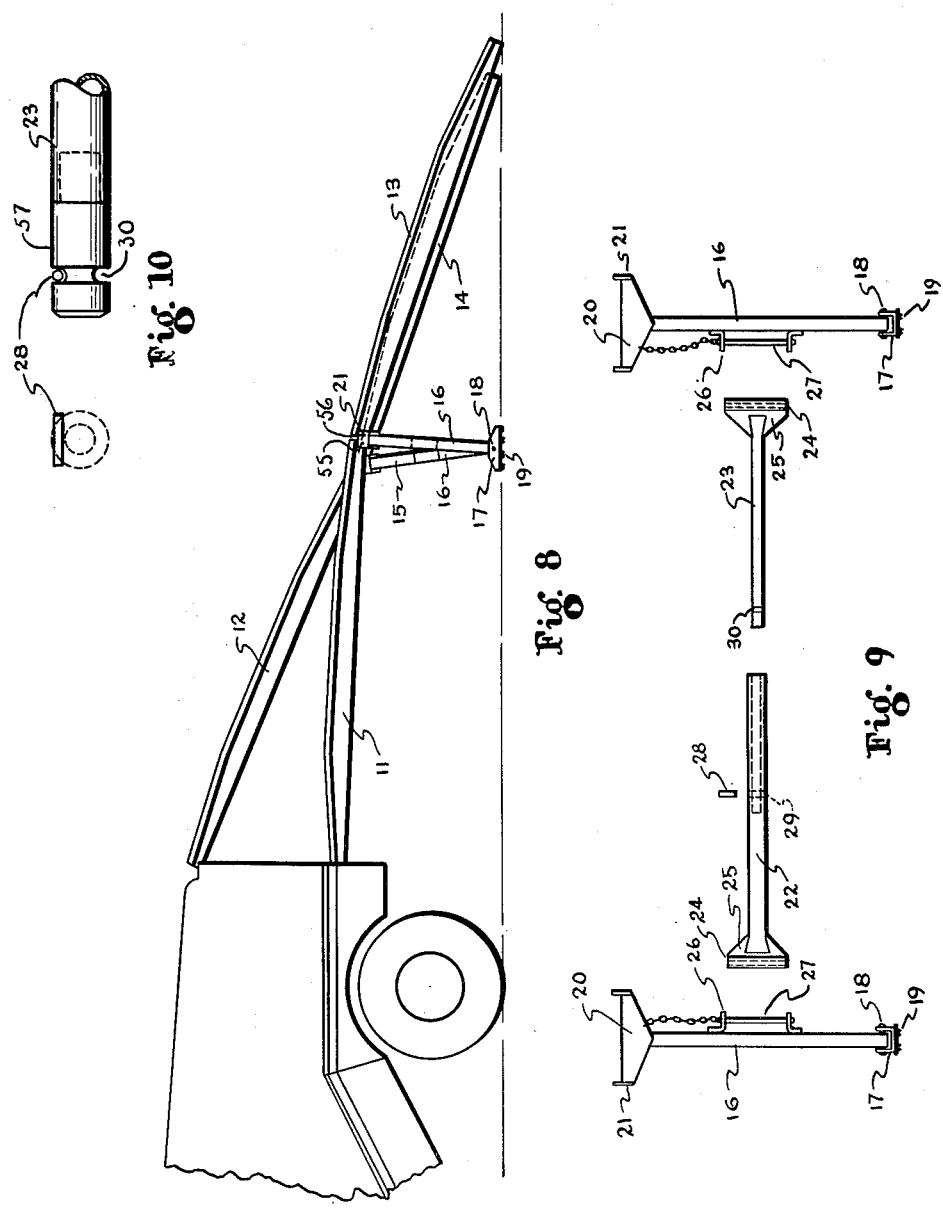
INVENTOR.
EDWARD MULLEN
JOHN BOYKO
BY
Joseph Farley
ATTORNEY Patented May 6, 1952

2,595,533

UNITED STATES PATENT OFFICE 2,595,533

LOADING EQUIPMENT FOR VEHICLE CARRYING TRAILERS

Edward Mullen and John Boyko, Detroit, Mich., assignors to Mechanical Handling Systems, Inc., Detroit, Mich., a corporation of Michigan Application May 10, 1946, Serial No. 668,964

10 Claims. (Cl. 193—41)

This invention is concerned with improvements in the construction and design of loading equipment of the type used in placing vehicles upon carrying trailers, and is particularly concerned with equipment which will be suitable for loading trailers having provisions for carrying vehicles at different levels.

While many forms of loading equipment of this kind have been used, it is the principal object of the present invention to provide a structure which has been simplified and consists of a minimum number of parts so that the operation of erecting the equipment will be easier and quicker and so that the equipment will weigh less, cost less and take up a lesser amount of space when disassembled.

Another object is to develop a loading structure which can be positioned to load vehicles to different levels without any change or substitution in the parts comprising that structure.

To further facilitate loading to different levels, another object is to disclose means to aid in raising the loading equipment to the level of the upper deck of a trailer, but at the same time to design the equipment so that the use of such raising means is optional.

It is also particularly desired that the equipment, in addition to attaining all of the foregoing objects, can be assembled, disassembled and changed from one loading level to another by one man under ordinary conditions.

The drawings forming a part of this specification and illustrating this invention consist of:

Fig. 1, a schematic showing in elevation of the rear portion of a vehicle carrying trailer with the loading equipment in position;

Fig. 2, an end view of a support assembly;

Fig. 3, an end view of the left half of the body of a trailer;

Fig. 4, a fragmentary plan view of a portion of the rear end of a trailer showing the relationship of the hoisting gear of the present invention thereto, this hoisting gear being shown in a down position;

Fig. 5, Fig. 6 and Fig. 7, sectional views of latch details taken, respectively, along the lines 5—5, 6—6 and 7—7 of Fig. 3;

Fig. 8, a view similar to Fig. 1, showing the loading equipment attached to the rear end of a trailer;

Fig. 9, an end view showing the support assembly of Fig. 2 exploded; and

Fig. 10, an enlarged detail of the center portion of the cross-member of the support assembly.

The principal parts of the loading equipment of this invention consist of four conventional ramps or skids, two of which, the skids 11 and 12, lead from the rear of a trailer to a support assembly 15, while the two remaining skids 13 and 14 extend from this support assembly to the ground so that the four skids and the support assembly combine to form two treads over which vehicles may be driven. All these parts are most clearly shown in Fig. 8 of the drawings, which illustrates a transitional condition where the near-side skids 11 and 13 are positioned to the lower vehicle carrying deck of the trailer while the far-side set of skids 12 and 14 have been raised to the upper deck of the trailer. This process of changing the position of the skids from one level to another will be more fully explained later in this description.

The support assembly 15 is illustrated completely in Fig. 2 and in a similar but exploded view in Fig. 9. It consists of two identical upright members 16 to which the skids are detachably attached. Each of these upright members is preferably provided with some form of non-slip device such as a shoe 17, pivotally secured to the lower end of the member 16 by a bolt 18, and formed with hardened teeth 19 on its bottom surface to prevent slipping. At its upper end, the upright member is equipped with a yoke or bracket which is made up of two transverse plates 20 bounded at each end by a vertical plate 21 which is drilled to receive pins used to pivotally attach each skid to this support assembly. To add transverse rigidity to the structure and to insure and maintain proper spacing or tread width between the skids, the upright members of the support assembly are connected by a split crossmember which can be broken down into a left and right hand half as shown by Fig. 9. The cross-bar portions of the halves of this crossmember are both fabricated of round tubing to provide a left hand cross-bar 22 and a right hand cross-bar 23, each of different diameter tubing, so that one cross-bar may be inserted within the other to complete the cross-member; and for attachment of the cross-member to the upright members, a vertical length of tubing 24 is attached to one end of each of the cross-bars 22 and 23 and is reinforced with gusset plates 25. When the support assembly is put together, these vertical lengths of tubing 24 of the cross-member fit between two brackets 26 on each of the upright members 16 and are held in position by pins 27 which engage both the brackets 26 and the tubing 24, giving a pivotal type of connection between the cross-member and the upright members about axes parallel to the latter. Completing the interlocking of the parts of this support assembly is a pin 28 holding the two halves of the cross-member together. This pin 28 fits in a hole 29 in the left hand or larger diameter cross-bar 22 and rests in a groove 30 formed in a plug or end piece 57 attached to the smaller right hand cross-bar 23, providing a type of connection between the two cross-bars which permits rotational or axial movement of one relative to the other. Thus it is to be noticed that the connections between the components of this support assembly are in all cases such as to allow relative movement between the parts joined, and all these connections are dimensioned for a loose fit between the parts. The importance of this feature will be more fully appreciated when the erection and operation of the structure is discussed later in this specification.

In the complete and preferred form of the invention, the skids 11 and 12, which lead from the support assembly to the rear of the trailer, are attached to a hoisting gear which is built as part of the trailer body, as may be seen from Figs. 1, 3 and 4 of the drawings. Since these figures show only the left half of the trailer body, it is to be understood that the structures shown are duplicated in the right half of the body to form the complete unit. This hoisting gear is composed of two arms 32, each pivotally connected to a support 33 on a side of the trailer body by a bolt 34, and the arms 32 and location of their pivotal connection to the trailer body are designed so that the free ends of the arms 32 may be swung through an arc which will lie adjacent to the ends of the upper and lower decks of the trailer. Extending between the arms 32 across the end of the trailer body is a cross-bar 35 which joins the arms so they will move in unison and which acts as a support for the skids 11 and 12.

Lifting power is provided in the form of a spring 36 encased in a cylinder 37, one of these assemblies being mounted along each side of the trailer body. An actuating rod 38 extends into the cylinder 37 and through the core of the spring 36 and engages the spring by means of a piston 39 held on the rod by a nut 40. A cable 41 leads from a point 42 on the trailer body, about a pulley 43 secured to the actuating rod 38, around a guide pulley 44 fixed to the trailer body, and thence to the arm 32. By this arrangement the spring 36 will be compressed when the arms 32 are in their down position with the cross-bar 35 at the level of the trailer's lower deck, so that upon unlatching the cross-bar from this position, the energy of the springs will be available to aid in raising the skids supported by the cross-bar to the level of the upper deck.

Satisfactory latches for holding this hoisting gear in its lower and upper positions are shown on the trailer body in Fig. 3 and in detail in Figs. 5 to 7. Three similar latch assemblies are used, one to hold the hoisting gear down and two to support it at the upper level, the two upper latches being inverted from the position of the lower latch as may be seen from a comparison of Figs. 5 and 7. Each latch assembly is made up of a combination latch bracket and keeper member having a central keeper portion 45 bounded on each side by brackets 46 which are secured to the trailer body and which are drilled to receive a shaft 47. A latch 48 is fastened to the shaft 47 between the brackets 46 by a pin 49. From Fig. 3 it can be seen that the one lower latch assembly is attached to the central part of the trailer body and in this assembly a latch release handle 50 is mounted on the shaft 47 immediately adjacent to the assembly itself. The two upper latches are attached near the sides of the trailer and have a common shaft 47' which extends across the trailer and carries a latch release handle 51 so that both upper latches can be simultaneously disengaged. The latch release handle 51 is normally held in the closed or locked position by a spring 52 interposed between the handle and the trailer body, and a similar arrangement is used with the lower latch release handle 50.

In assembling this equipment the first pair of skids 11 and 12 are placed at the rear of the trailer so as to be in alignment with the trailer's lower tracks 54, these skids being equipped with a hook 53 at one end, adapted to engage the cross-bar 35 of the hoisting gear. The other end of each of these skids is attached to one of the upright members of the support assembly by a pin 55, and next the cross-member of the support assembly can be added. Finally, the remaining pair of skids 13 and 14 are attached to the support assembly by pins 56 to form a continuous ramp from the trailer to the ground. It is to be noticed that when the equipment is properly put together the upright members of the support assembly do not extend perfectly vertically but rather are positioned so that they lean slightly rearwards when the equipment is set up to load the lower deck of the trailer.

After vehicles have been loaded upon the lower deck, the loading level is changed to the upper deck by the operator pulling on the latch release handle 50 and raising the skids 11 and 12 until the cross-bar 35 is engaged by the upper latches. Aided by the energy stored in the springs of the hoisting gear, this operation is easily performed by one man. During this operation, the skids are moved from the dotted to the full line position of Fig. 1 and this movement of the skids is accompanied by a swinging of the upright members of the support assembly about the bolt 18 connecting these members to the shoe 17. Thus the upright members of the support assembly now lean slightly forwardly.

Many trailers will not be equipped with the hoisting gear of this invention because of the extra cost involved and also because this loading equipment can be used satisfactorily without it due to the design and operation of the support assembly. If no hoising gear is used, means other than the cross-bar are provided on the rear of the trailer for the attachment of the skids. Otherwise, the skids and their support assembly are erected in the same manner as previously described. When, in the process of loading the trailer, it becomes necessary to position the skids to the upper deck, they can be raised manually by lifting one side at a time. Fig. 8 illustrates this procedure by showing the near-side skids 11 and 13 still at their lower level while the far-side skids 12 and 14 have been raised to the level of the upper deck. Such individual movement of the skids is made possible by the construction of the support assembly 15 and the relative movement which can occur between the parts thereof; for during the lifting of one set of skids, the upright member 16 of the support assembly to which those skids are attached can pivot about the shoe 17 on which it rests, and to relieve the torsional resistance which would otherwise be set up in the cross-member upon such pivotal movement of an upright member, the ends of the cross-member swing about the pins 27 holding them to the upright members while one-half of the cross-member is free to rotate relative to the other half.

This flexibility of the support assembly is of further advantage in that it permits the loading structure as a whole to be adjusted to compensate for all usual unevenness in any direction between the surface from which vehicles are being loaded and the body of the trailer being loaded, which of course results in the loading structure affording greater rigidity and safety.

Concerning the means used to mechanically raise the skids to an upper loading level, while a counterbalancing type of spring has been disclosed and described herein, if a more positive and complete lifting mechanism is desired, the hoisting gear may readily be made hydraulically actuated with pressure being supplied to the hydraulic actuating cylinders either by a hand operated or power driven pump. As the use of devices of this type is a well known art, it is not considered necessary to specifically illustrate and describe an installation of this type in this specification. Likewise, other minor changes and departures from the structures shown may be made within the scope of this invention as defined by the following claims.

We claim:

1. In equipment of the type described, a supporting assembly comprising spaced upright members and a cross-member extending between said upright members, said cross-member being connected to said upright members to permit relative movement between said cross-member and said upright members about axes parallel to each of said upright members and another axis coincident with the centerline of said cross-member whereby said spaced upright members can be positioned so that a plane which includes one of said upright members and said cross-member will not include a second of said upright members.

2. In equipment of the type described, a supporting assembly comprising spaced upright members and a cross-member extending between said upright members, a shoe pivotally secured to the lower end of each of said upright members, said cross-member being connected to said upright members to permit relative movement between said cross-member and said upright members about axes parallel to each of said upright members and another axis coincident with the centerline of said cross-member, whereby said spaced upright members can be independently pivoted about an axis joining their said lower ends.

3. In equipment of the type described, a supporting assembly comprising spaced upright members and a cross-member extending between said upright members, means provided at the lower end of each of said upright members to prevent slippage between such end and a supporting surface therefor, said cross-member being connected to said upright members to permit relative movement between said cross-member and said upright members about axes parallel to each of said upright members and another axis coincident with the centerline of said cross-member, whereby said spaced upright members can be independently pivoted about an axis joining their said lower ends.

4. In equipment of the type described, a supporting assembly comprising spaced upright members and a cross-member extending between said upright members, means provided at the lower end of each of said upright members to prevent slippage between such end and a supporting surface therefor, said cross-member being pivotally connected to each of said upright members, said cross-member being composed of a plurality of sections, said sections being interconnected by means to permit relative axial rotational movement between said sections and to limit relative longitudinal movement between said sections.

5. In equipment of the type described, a supporting assembly comprising spaced upright members and a cross-member extending between said upright members, means provided at the lower end of each of said upright members to prevent slippage between such end and a supporting surface therefor, said cross-member being pivotally connected to each of said upright members, said cross-member having inner and outer tubular sections and means whereby one of said sections can rotate axially relative to the other of said sections, said means comprising an annular groove formed in the inner of said sections and an inwardly projecting member carried by said outer section, said inwardly projecting member engaging said annular groove.

6. Equipment for loading and unloading a conveyance having different load carrying levels wherein pairs of skids and a support assembly are used to form two continuous treads from said conveyance to said support assembly and thence to the ground, characterized by said support assembly comprising upright members hinged to the skids of each of said treads, a cross-member extending between said upright members, and means provided at the lower end of each of said upright members to prevent slippage between such end and the ground, said cross-member being connected to said upright members to permit relative movement between said cross-member and said upright members about axes parallel to each of said upright members and another axis coincident with the centerline of said cross-member, said raising of said skids to a higher loading level being accompanied by a change in the angular relationship of said upright members to the ground whereby said upright members pass through a true vertical position during said raising.

7. Equipment for loading and unloading a conveyance having different load carrying levels wherein pairs of skids and a support assembly are used to form two continuous treads from said conveyance to said support assembly and thence to the ground, characterized by said support assembly comprising upright members hinged to the skids of each of said treads, a cross-member extending between said upright members, and means provided at the lower end of each of said upright members to prevent slippage between such end and the ground, said cross-member being connected to said upright members to permit relative movement between said cross-member and said upright members about axes parallel to each of said upright members and another axis coincident with the centerline of said cross-member whereby the skids of one of said continuous treads can be positioned to a different loading level independently of the loading position of other of said treads, such change in position of said skids being accompanied by a change in the angular relationship of the upright member hinged to said skids relative to the ground.

8. Equipment for loading and unloading a conveyance having different load carrying levels wherein pairs of skids and a support assembly are used to form two continuous treads from said conveyance to said support assembly and thence to the ground, characterized by said support assembly comprising upright members detachably hinged to the skids of each of said treads, a cross-member extending between said upright members and connections between said cross member and said upright members to permit independent horizontal and vertical movement of each tread and to constrain said upright members against movement transversely of said treads, a base plate pivotally secured to the lower end of said upright members, said raising of said skids being accompanied by a change in the angular relationship of said upright members to the ground.

9. Loading equipment for use with a conveyance having a plurality of load carrying levels and power operated means for selectively positioning one end of such equipment at one of said levels, comprising a ramp member having means for hinging one end thereof to said positioning means, an upright, a second ramp member, connecting means between each of said ramp members and said upright permitting articulation of each ramp relative to said upright, and a supporting shoe pivotally secured to the lower end of said upright, said loading equipment being movable as a unit to a different loading level when connected to said positioning means through the articulation between each of said ramps and said upright and between said upright and said supporting shoe.

10. A supporting assembly comprising a pair of spaced upright members, means located adjacent the upper end of each of said upright members for the pivotal attachment of a load supporting member thereto, a cross member extending between said upright members, said cross member and said upright members being interconnected to permit relative movement about axes parallel to each of said upright members and about another axis substantially parallel to said cross member.

EDWARD MULLEN.
JOHN BOYKO.

REFERENCES CITED

The following references are of record in the file of this patent:

UNITED STATES PATENTS

| Number | Name | Date |
|---|---|---|
| 587,082 | Shanks | July 27, 1897 |
| 963,918 | Miller | July 12, 1910 |
| 1,620,256 | Heise | Mar. 8, 1927 |
| 1,951,660 | Klaudt | Mar. 20, 1934 |
| 2,100,694 | Judd | Nov. 30, 1937 |
| 2,350,641 | Ruddock | June 6, 1944 |
| 2,370,334 | Wachter | Feb. 27, 1945 |
| 2,424,862 | Stuart | July 29, 1947 |

FOREIGN PATENTS

| Number | Country | Date |
|---|---|---|
| 357,673 | Great Britain | Oct. 1, 1931 |